United States Patent
Sharma et al.

(10) Patent No.: US 12,372,656 B2
(45) Date of Patent: Jul. 29, 2025

(54) AIRCRAFT IDENTIFICATION

(71) Applicant: HONEYWELL INTERNATIONAL INC., Charlotte, NC (US)

(72) Inventors: Manuj Sharma, Charlotte, NC (US); Manoj Gopinath, Charlotte, NC (US); Puneet Sharma, Charlotte, NC (US); Rajesh V. Poojary, Charlotte, NC (US); Vinay Sridhara Murthy, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 281 days.

(21) Appl. No.: 17/806,196

(22) Filed: Jun. 9, 2022

(65) Prior Publication Data
US 2022/0397676 A1    Dec. 15, 2022

(30) Foreign Application Priority Data
Jun. 9, 2021    (IN) .............................. 202111025611

(51) Int. Cl.
*G01S 17/894*    (2020.01)
*G01S 17/933*    (2020.01)

(52) U.S. Cl.
CPC .......... *G01S 17/894* (2020.01); *G01S 17/933* (2013.01)

(58) Field of Classification Search
None
See application file for complete search history.

(56) References Cited

U.S. PATENT DOCUMENTS

| | | | |
|---|---|---|---|
| 5,675,661 A | * | 10/1997 | Richman ................. B64F 1/002 382/104 |
| 2005/0099637 A1 | * | 5/2005 | Kacyra ................ G01B 11/002 356/601 |

(Continued)

FOREIGN PATENT DOCUMENTS

| CN | 111427374 | 7/2020 |
|---|---|---|
| CN | 112258898 A | 1/2021 |

(Continued)

OTHER PUBLICATIONS

Brassel, et al., "3D Modeling of the airport environment for fast and accurate LiDAR semantic segmentation of apron operations"; 2020 AIAA/IEEE 39th Digital Avionics Systems Conference (DASC), 2020 (10 pgs).

(Continued)

*Primary Examiner* — David H Chu
(74) *Attorney, Agent, or Firm* — Brooks, Cameron & Huebsch, PLLC

(57) ABSTRACT

Methods, devices, and systems for aircraft identification are described herein. In some examples, one or more embodiments include a computing device comprising a memory and a processor to execute instructions stored in the memory to simulate virtual light detection and ranging (Lidar) sensor data for a three-dimensional (3D) model of an aircraft type to generate a first point cloud corresponding to the 3D model of the aircraft type, generate a classification model utilizing the simulated virtual Lidar sensor data of the 3D model of the aircraft type, and identify a type and/or sub-type of an incoming aircraft at an airport by receiving, from a Lidar sensor at the airport, Lidar sensor data for the incoming aircraft, generating a second point cloud corresponding to the incoming aircraft utilizing the Lidar sensor data for the incoming aircraft, and classifying the second point cloud (Continued)

corresponding to the incoming aircraft using the classification model.

19 Claims, 4 Drawing Sheets

(56) References Cited

U.S. PATENT DOCUMENTS

| | | |
|---|---|---|
| 2009/0210205 A1 | 8/2009 | Sullivan et al. |
| 2010/0250482 A1 | 9/2010 | Ma |
| 2017/0262732 A1* | 9/2017 | Deng ................ G08G 5/06 |
| 2018/0197301 A1* | 7/2018 | Anderson ............ G08G 5/06 |
| 2019/0147752 A1* | 5/2019 | Scarlatti ........... G08G 5/0043 |
| | | 701/120 |
| 2019/0228571 A1* | 7/2019 | Atsmon ............. G06F 30/20 |
| 2020/0090532 A1* | 3/2020 | Håkansson .......... G08G 5/003 |
| 2020/0160598 A1* | 5/2020 | Manivasagam ........ G07C 5/02 |
| 2020/0301799 A1 | 9/2020 | Manivasagam et al. |
| 2022/0206117 A1* | 6/2022 | Qiu .................. G01S 17/894 |

FOREIGN PATENT DOCUMENTS

| | | |
|---|---|---|
| CN | 112530022 A | 3/2021 |
| EP | 3079136 A1 | 10/2016 |
| WO | 9612265 A1 | 4/1996 |
| WO | 2018002910 A1 | 1/2018 |
| WO | 2020065093 A1 | 4/2020 |
| WO | 2020190781 A1 | 9/2020 |

OTHER PUBLICATIONS

Mund, et al., "Introducing LiDAR Point Cloud-Based Object Classification for Safer Apron Operations"; Research Gate, International Symposium on Enhanced Solutions for Aircraft and Vehicle Surveillance Applications, Apr. 15, 2016 (11 pgs) https://www.researchgate.net/publication/301219142.

* cited by examiner

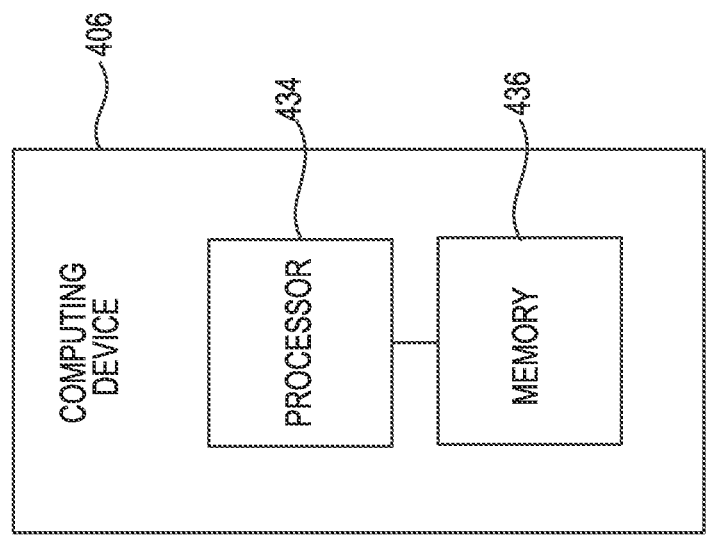

AIRCRAFT IDENTIFICATION

CROSS-REFERENCE TO RELATED APPLICATIONS

This application claims priority pursuant to 35 U.S.C. 119(a) to India Patent Application No. 202111025611, filed Jun. 9, 2021, which application is incorporated herein by reference in its entirety.

BACKGROUND

Air traffic control (ATC) at an airport can direct aircraft on the ground and aircraft in airspace near the airport, as well as provide advisory services to other aircraft in airspace not controlled by ATC at the airport. Directing aircraft on the ground and in the air can prevent collisions between aircraft, organize and expedite aircraft traffic, and provide information and/or support for aircraft pilots.

ATC may need to direct many different aircraft in and around the airport. To direct these aircraft safely and efficiently, ATC controllers may need to know the type of these aircraft as well as their location. For instance, an ATC controller may need to utilize the aircraft type and aircraft sub-type and/or the aircraft location to determine information regarding different aircraft types and aircraft sub-types, prioritize certain aircraft, and take actions to safely and efficiently direct those aircraft based on the aircraft type and aircraft sub-types and their locations.

To ensure the safety of the aircraft and ramp operations, the systematic approach of detecting the aircraft type and sub-type and validation against the planned aircraft can be important before initiating docking. An ATC controller, such as an apron controller may have to ensure that the correct aircraft type/sub-type is docked at the correct stop bar.

BRIEF DESCRIPTION OF THE DRAWINGS

FIG. 4 is an example of a computing device for aircraft identification, in accordance with one or more embodiments of the present disclosure.

DETAILED DESCRIPTION

Figure 1:
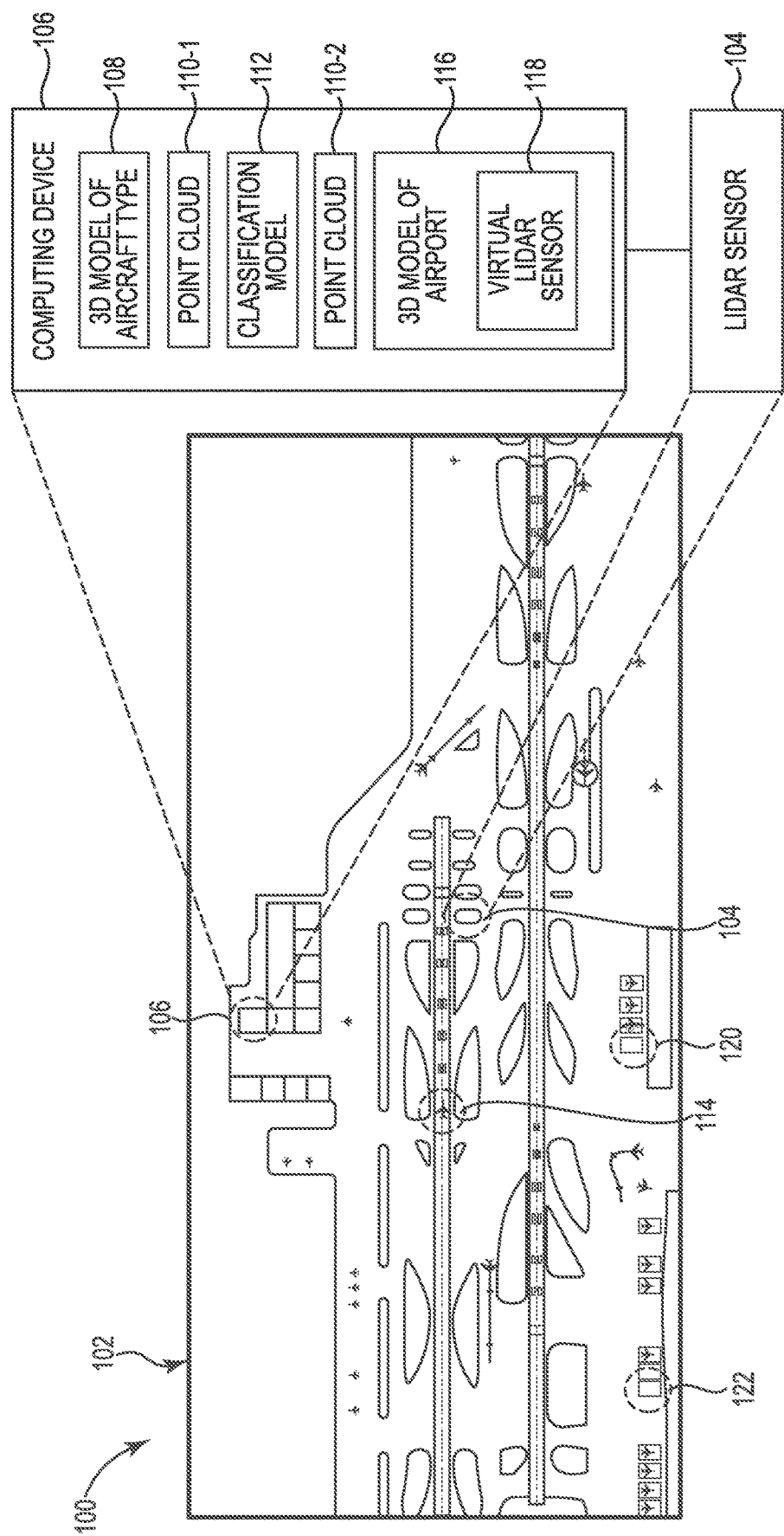
FIG. 1 is an example of an airport including an incoming aircraft for aircraft identification, in accordance with one or more embodiments of the present disclosure.

Methods, devices, and systems for aircraft identification and aircraft type and subtype classification are described herein. In some examples, one or more embodiments include a computing device comprising a memory and a processor to execute instructions stored in the memory to simulate virtual light detection and ranging (Lidar) sensor data for a three-dimensional (3D) model of an aircraft type to generate a first point cloud corresponding to the 3D model of the aircraft type, generate a classification model utilizing the simulated virtual Lidar sensor data of the 3D model of the aircraft type, and identify a type of an incoming aircraft at an airport by receiving, from a Lidar sensor at the airport, Lidar sensor data for the incoming aircraft, generating a second point cloud corresponding to the incoming aircraft utilizing the Lidar sensor data for the incoming aircraft, and classifying the second point cloud corresponding to the incoming aircraft using the classification model. Further, the computing device can execute instructions stored in the memory to identify a location of an incoming aircraft and a pose of the incoming aircraft.

When directing an aircraft around an airfield of an airport, it can be helpful to know a type of the aircraft and/or a sub-type of the aircraft. As used herein, the term "type of aircraft" refers to a make and model of an aircraft. In some examples, the type of aircraft can include an alphanumeric code designating a type of aircraft. For example, the aircraft manufacturer Boeing can manufacture an aircraft type referred to as a Boeing B757, where the type of aircraft describes the make (e.g., Boeing) and model (e.g., 757) of the aircraft. Additionally, as used herein, the term "sub-type" of aircraft refers to variants of types of aircraft that may describe performance and/or service characteristics of the aircraft. For example, within the aircraft type B757, Boeing may manufacture different sub-types of the 757 model, such as 757-200, 757-300 (which may include a different length than the 757-200), 757-200PF (a cargo version of the 757-200), etc.

Accordingly, when directing aircraft around an airfield at an airport, it can be helpful for ATC to know the aircraft type and/or sub-type. Knowing the aircraft type and/or aircraft sub-type can allow an ATC controller to assign taxi routes and/or stopping points to aircraft to safely direct aircraft around an airfield and/or to prevent delays. For instance, in some examples an ATC controller may direct aircraft to take different taxi routes through the airfield at the airport based on the aircraft type and/or aircraft sub-type, as wingspan limitations on certain aircraft may not allow for aircraft to taxi past each other, take certain taxi routes, etc. Additionally, an ATC controller may assign an aircraft to a particular stopping location, such as a particular gate at a terminal, in order to avoid an aircraft parking at a gate that cannot support the aircraft (e.g., due to aircraft dimension limitations, availability of applicable servicing equipment such as refueling equipment, jet bridge placement, baggage handling equipment, etc. to prevent delays for passengers and/or airlines. Accordingly, knowing which type and/or sub-type of aircraft can allow an ATC controller to safely and efficiently direct aircraft around an airfield.

Some airports may utilize a video detection and guidance system for identification of incoming aircraft. For example, a video detection and guidance system may determine an incoming aircraft is approaching and/or at an airfield of an airport and may identify a type of aircraft using various sensing systems. Such sensing systems may include video cameras, radio detection and ranging (radar) systems, etc. However, such approaches are unable to identify an aircraft sub-type.

Aircraft identification, in accordance with the present disclosure, can allow for aircraft type and sub-type identification. Such identification can be utilized to reliably distinguish between closely resembled aircraft sub-types. Identification of aircraft types and sub-types can allow for safe and efficient direction and taxiing of aircraft through an airfield of an airport to a stopping location.

In some examples, tracking an incoming aircraft at the airfield can be accomplished using three-dimensional (3D)

light detection and ranging (Lidar) sensors. Such 3D Lidar sensors can track incoming aircraft through the airfield for taxi route and stopping location determination. However, 3D Lidar sensors are expensive and may not be affordable for all airports. Further, 3D Lidar sensors can output a large amount of data for processing when tracking aircraft, which can tax computing devices tasked for processing of such data.

Aircraft identification, in accordance with the present disclosure, can further allow for identification and tracking of aircraft at an airfield of an airport by determining a pose of an incoming aircraft without the use of a 3D Lidar sensor. Accordingly, identification and tracking of an aircraft at an airfield in accordance with the present disclosure can be accomplished reliably and more cheaply as compared with previous approaches. Such approaches can allow for an increase in efficiency and safety of airport operations.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component. Additionally, the designator "N", as used herein particularly with respect to reference numerals in the drawings, indicates that a number of the particular feature so designated can be included with a number of embodiments of the present disclosure. This number may be the same or different between designations.

FIG. 1 is an example of an airport 100 including an incoming aircraft 114 for aircraft identification, in accordance with one or more embodiments of the present disclosure. The airport 100 can include an airfield 102, a Lidar sensor 104, a computing device 106, a stopping location 120, and an updated stopping location 122.

As illustrated in FIG. 1, the airport 100 can include a computing device 106. As used herein, the term "computing device" refers to an electronic system having a processing resource, memory resource, and/or an application-specific integrated circuit (ASIC) that can process information. Examples of computing devices can include, for instance, a laptop computer, a notebook computer, a desktop computer, a server, networking equipment (e.g., router, switch, etc.), and/or a mobile device, among other types of computing devices. As used herein, a mobile device can include devices that are (or can be) carried and/or worn by a user. For example, a mobile device can be a phone (e.g., a smart phone), a tablet, a personal digital assistant (PDA), smart glasses, and/or a wrist-worn device (e.g., a smart watch), among other types of mobile devices.

For instance, the computing device 106 can be a computing device located at the airport 100. The computing device 106 can enable a user, such as an air traffic controller, ground controller, and/or any other type of user to utilize the computing device 106 for aircraft identification according to embodiments of the present disclosure. The computing device 106 can be located at the airport 100 to be utilized for aircraft identification as is further described herein. The computing device 106 can be, for instance, a display module located at a gate at the airfield 102 of the airport 100 for a pilot of an aircraft, among other examples.

In order to begin aircraft identification, the computing device 106 can simulate virtual Lidar sensor data for a 3D model of an aircraft type 108 to generate a first point cloud 110-1 corresponding to the 3D model of the aircraft type 108, as is further described herein. The 3D model of the aircraft type 108 can be a predefined polygonal mesh model. For example, the 3D model of the aircraft type 108 can be a predefined model of, for instance, a Boeing 757-300, where the predefined model is composed of a collection of vertices, edges, and faces that define the shape of an object (e.g., a Boeing 757-300). The polygonal mesh 3D model of the aircraft type 108 can be stored in memory locally at the computing device 106 and/or be stored remotely at a remote computing device and accessible by the computing device 106 via a network relationship with the remote computing device.

Further, although the computing device 106 is described as including a 3D model of an aircraft type 108 to be a Boeing 757-300, embodiments of the present disclosure are not so limited. For example, the computing device 106 can include a plurality of 3D models of different aircraft types. Such different aircraft types can include other sub-types of the Boeing 757 (e.g., Boeing 757-200, Boeing 757-200PF, etc.), other aircraft types and associated sub-types (e.g., Boeing 747 and associated sub-types, Boeing 787 and associated sub-types, Airbus A380 and associated sub-types, Airbus A330 and associated sub-types, McDonnell Douglas MD-90 and associated sub-types, etc.), and/or any other type and/or sub-type of aircraft that may arrive to and/or depart from the airport 100.

The virtual Lidar sensor data for the 3D model of the aircraft type 108 can be simulated using a simulation software program. As used herein, the term "virtual Lidar sensor data" refers to data generated as a result of simulated Lidar sensor returns on a model of an object. For example, the virtual Lidar sensor data can utilize a virtual Lidar sensor 118 located in a 3D model of the airport 116. The 3D model of the airport 116 can be a polygonal mesh model of the airport 100. The 3D model of the airport 116 can include models of objects in and/or around the airport 100, including the airfield 102 (e.g., runways, taxiways, aircraft stands of varying types, stop bar details, etc.), terminals, service buildings, vehicles on the airfield 102 and/or at the airport 100 (e.g., aircraft, service vehicles, baggage carts, etc.), details associated with objects at the airport 100 (e.g., aircraft stand types, allowed aircraft types and/or sub-types for the aircraft stands, stand configurations, etc.), and/or any other objects at the airport 100.

Utilizing the simulation software program, the computing device 106 can simulate targeting of the 3D model of the aircraft type 108 with the virtual Lidar sensor 118 having a virtual laser and logging the reflected virtual returned light from the 3D model of the aircraft type 108. Such simulation can generate a first point cloud 110-1 corresponding to the 3D model of the aircraft type 108. As used herein, the term "point cloud" refers to a set of data points in space. The first point cloud 110-1 can be a set of data points representing the 3D model of the aircraft type 108, and such data points can represent an outer surface of the 3D model of the aircraft type 108.

As described above, the computing device 106 can simulate the Lidar sensor data for the 3D model of the aircraft type 108 to generate the first point cloud 110-1 at a particular location on the 3D model of the airport 116. Since an aircraft may move around an airfield, the computing device 106 can further simulate virtual Lidar sensor data for the 3D model of the aircraft type 108 along a predefined trajectory from an initial location to a stopped location in the 3D model of the airport 116. For example, the computing device 106 can simulate the virtual Lidar sensor data for the 3D model of the aircraft type 108 (e.g., the 3D model of the Boeing 757-300) at all points along a predefined trajectory that may be defined from a location on a runway where the aircraft would land (e.g., an initial location) to a gate where the aircraft would park (e.g., a stopped location). Such a trajectory can represent a possible taxi route through the airfield 102. Accordingly, the computing device 106 can simulate the virtual Lidar sensor data for the 3D model of the Boeing 757-300 to generate a plurality of point clouds that can represent the 3D model of the Boeing 757-300 at all points along the predefined trajectory, where each point along the predefined trajectory can be at a known distance from a location of the virtual Lidar sensor in the 3D model of the airport 116. In other words, a point cloud corresponding to the 3D model of the aircraft type 108 can be generated at each point along the predefined trajectory and each point cloud generated at each point along the predefined trajectory can include a location relative to the location of the virtual Lidar sensor in the 3D model of the airport 116.

The computing device 106 can repeat this process to generate point clouds of the 3D model of the aircraft type 108 for a plurality of predefined trajectories in the 3D model of the airport 116. Such a plurality of predefined trajectories in the 3D model of the airport 116 can represent all of the possible trajectories that can be taken on the airfield 102 at the airport 100. Further, the computing device 106 can repeat this process to generate a plurality of point clouds for a plurality of predefined trajectories in the 3D model of the airport 116 for all of the plurality of 3D models of the different aircraft types and sub-types.

Using this simulated virtual Lidar sensor data for the 3D model of the aircraft type 108, as well as the simulated virtual Lidar sensor data for the other plurality of 3D models of aircraft and all possible trajectories, the computing device 106 can generate a classification model 112. For example, the classification model can include a plurality of simulated point clouds corresponding to different 3D models of aircraft, where such different 3D models of aircraft can include different aircraft types and aircraft sub-types. As used herein, the term "classification model" refers to a predictive modeling process including predicting a class of given data points. The classification model 112 can, in some embodiments, be a machine learning classification algorithm/model. The classification model 112 can utilize the simulated virtual Lidar sensor data described above to identify an aircraft type and/or sub-type based on data points from a Lidar sensor 104 located at the airport 100, as is further described herein.

As illustrated in FIG. 1, the airport 100 can have an incoming aircraft 114. The incoming aircraft 114 can be arriving at (e.g., landing at) the airport 100. As the incoming aircraft 114 is arriving, it may be beneficial for ATC at the airport 100 to identify the type and/or the sub-type of the incoming aircraft 114 for purposes of planning a taxi route from the runway to a stopping location, resource allocation planning (e.g., refueling equipment, jet bridge placement, baggage handling equipment to handle unloading of the incoming aircraft 114, etc.)

The computing device 106 can identify the incoming aircraft 114 by receiving, from the Lidar sensor 104 at the airport 100, Lidar sensor data for the incoming aircraft 114. As used herein, the term "Lidar sensor" refers to a device including a laser and a receiver to target an object with the laser, measure the time for the reflected light to return to the receiver, and transmit the associated data for processing and/or analysis. For example, the Lidar sensor 104 can measure time for emitted light from the Lidar sensor 104 to return to the Lidar sensor 104 after being reflected from the incoming aircraft 114. In some embodiments, the Lidar sensor 104 can be a two-dimensional (2D) Lidar sensor. For example, the 2D Lidar sensor 104 can determine horizontal distance to the incoming aircraft 114 to determine distance measurements from the Lidar sensor 104 to the incoming aircraft 114. The Lidar sensor 104 can be located on the airfield 102.

The computing device 106 can generate a second point cloud 110-2 corresponding to the incoming aircraft 114. For example, the computing device 106 can utilize the Lidar sensor data from the Lidar sensor 104 for the incoming aircraft 114 to generate the second point cloud 110-2.

Utilizing the second point cloud 110-2, the computing device 106 can classify the second point cloud 110-2 using the classification model 112. For example, the classification model 112 can utilize the second point cloud 110-2 generated from Lidar sensor data from the Lidar sensor 104 to predict the aircraft type and/or sub-type of the incoming aircraft 114 utilizing the simulated virtual Lidar sensor data described above. For example, the computing device 106 can determine, utilizing the classification model 112, the incoming aircraft 114 is a Boeing 757-300 based on the classification model 112 classifying the Lidar sensor data from the Lidar sensor 104 as a Boeing 757-300.

The computing device 106 can generate and transmit a stopping location 120 on the airfield 102 of the airport 100 to the incoming aircraft 114 based on the identified type and/or sub-type of the incoming aircraft 114. For example, the stopping location 120 may be able to be utilized for an aircraft of a type and/or sub-type (e.g., based on size, aircraft layout, etc.) and/or accessible via a particular trajectory through the airfield 102. The computing device 106 can, accordingly, transmit the stopping location 120 to the incoming aircraft 114. The incoming aircraft 114 can, as a result, taxi to the stopping location 120 assigned to the incoming aircraft 114.

In some examples, the computing device 106 may have a predetermined aircraft type associated with the incoming aircraft 114. For example, a may have entered into the computing device 106 information indicating the incoming aircraft 114 is a Boeing 757-200. This may be information received via radio transmissions, the user's observations, or by other means. The computing device 106 can compare the predetermined aircraft type and/or sub-type (e.g., Boeing 757-200) for the incoming aircraft 114 with the identified incoming aircraft type (e.g., Boeing 757-300).

In response to the predetermined aircraft type not matching the identified incoming aircraft type, the computing device 106 can transmit an alert to the incoming aircraft 114. For example, the predetermined aircraft type and sub-type of the incoming aircraft 114 may be Boeing 757-200 where the identified incoming aircraft type and sub-type is Boeing 757-300 (e.g., and the actual aircraft type of the incoming aircraft 114 is Boeing 757-300). The computing device 106 can transmit an alert to the incoming aircraft 114 to alert a user on board (e.g., such as a pilot, co-pilot, or other user) that the stopping location 120 may be updated, the taxi route may be changed, etc. The taxi route and/or stopping location 120 may be updated based on the size of the incoming aircraft 114 preventing the incoming aircraft 114 from safely traversing the taxi route (e.g., as a result of size limitations, of other aircraft on the airfield 102, etc.), from being able to stop at the stopping location 120 (e.g., size of incoming aircraft 114 is too large for the gate, gate jet bridge configuration does not work with the layout of the incoming aircraft 114, etc.)

The computing device 106 can update the stopping location 120 to 122 to correspond to the identified incoming aircraft type in response to the identified aircraft type not matching the predetermined aircraft type. For example, since the identified incoming aircraft type was determined to be a Boeing 757-300, the computing device 106 can update the stopping location 120 to be the updated stopping location 122, where the incoming aircraft 114 (e.g., a Boeing 757-300) is able to be received at the updated stopping location 122, can safely taxi to the updated stopping location 122, etc.

As such, identification of aircraft type and/or sub-type can allow for reliable identification of aircraft. Such type and sub-type identification can allow for safe and efficient direction and taxiing of aircraft through an airfield of an airport, such as to a stopping location.

Figure 2:
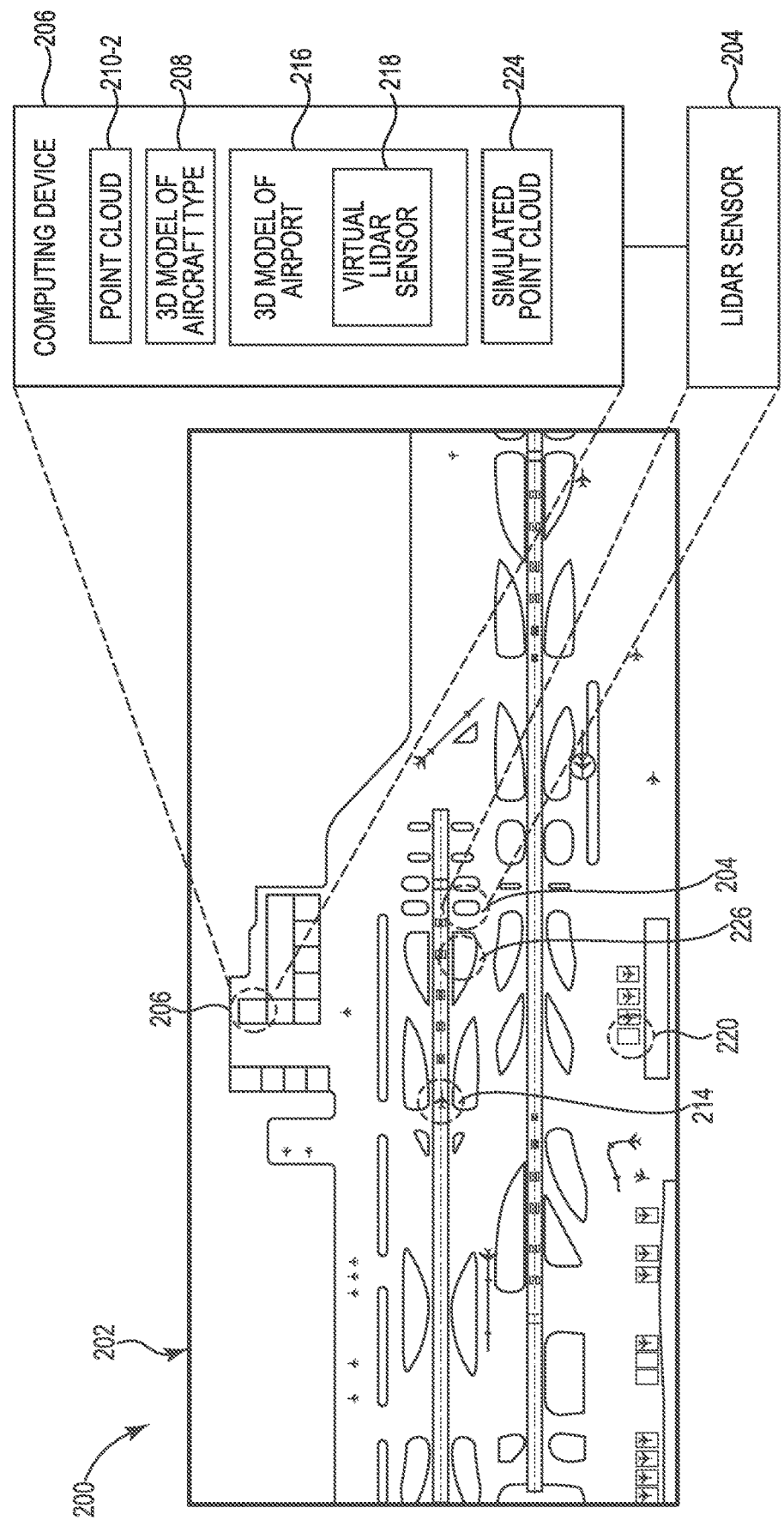
FIG. 2 is an example of an airport including an incoming aircraft for aircraft identification, in accordance with one or more embodiments of the present disclosure.

FIG. 2 is an example of an airport 200 including an incoming aircraft 214 for aircraft identification, in accordance with one or more embodiments of the present disclosure. The airport 200 can include an airfield 202, a Lidar sensor 204, and a computing device 206.

Aircraft identification can further include aircraft tracking by identifying a location of the incoming aircraft 214 on the airfield 202. Such location determination can be performed by the computing device 206, as is further described herein.

As previously described in connection with FIG. 1, the computing device 206 can receive Lidar sensor data for the incoming aircraft 214 from the Lidar sensor 204. The Lidar sensor 204 can be a Lidar sensor located on the airfield 202.

The computing device 206 can generate a point cloud 210-2 corresponding to the incoming aircraft 214. For example, the computing device 206 can utilize the Lidar sensor data from the Lidar sensor 204 for the incoming aircraft 214 to generate the point cloud 210-2.

Additionally, the computing device 206 can determine an initial pose of the incoming aircraft 214. As used herein, the term "pose" refers to an orientation of an aircraft relative to a particular location. For example, the computing device 206 can determine an initial pose of the incoming aircraft 214 from a location corresponding to a sensor on the airfield 202. The computing device 206 can determine the initial pose of the incoming aircraft 214 via a visual sensor 226 located on the airfield 202 of the airport 200. The visual sensor can be, for example, a camera (e.g., a video camera) which can be included as part of a video detection and guidance system at the airport 200, among other examples of visual sensors. The visual sensor 226 can be located proximate to the Lidar sensor 204 on the airfield 202 of the airport 200.

Determining the initial pose of the incoming aircraft 214 can include determining an orientation and a position of the incoming aircraft 214 relative to the visual sensor 226. For example, the orientation and the position of the incoming aircraft 214 can include attributes such as a yaw, pitch, roll, left/right, up/down/and/or a forward/backward location and orientation relative to the location of the visual sensor 226.

The computing device 206 can, as a result, orient a 3D model of the incoming aircraft 208 in a 3D model of an airfield of the airport 216. For example, the computing device 206 can orient the 3D model of the incoming aircraft 208 in an orientation and position in the 3D model of the airport 216 corresponding to the initial pose of the incoming aircraft 214.

The computing device 206 can simulate virtual Lidar sensor data for the 3D model of the aircraft 208 at the initial pose to generate a simulated point cloud 224 corresponding to the 3D model of the aircraft 208, where the 3D model of the aircraft 208 can be a predefined polygonal mesh model oriented in the initial pose. For example, utilizing a simulation software program, the computing device 206 can simulate targeting of the 3D model of the aircraft 208 with the virtual Lidar sensor 218 having a virtual laser and logging the reflected virtual returned light from the 3D model of the aircraft 208 with the 3D model of the aircraft 208 oriented in the initial pose. Such simulation can generate the simulated point cloud 224 corresponding to the 3D model of the aircraft 208. The simulated point cloud 224 can be a set of data points representing the 3D model of the aircraft 208, and such data points can represent an outer surface of the 3D model of the aircraft 208.

The computing device 206 can compare the simulated point cloud 224 with the generated point cloud 210-2 to determine a likelihood of the initial pose of the incoming aircraft 214 matching an actual pose of the incoming aircraft 214 via pose estimation. As used herein, the term "likelihood" refers to a measure of how well a model fits a set of observational data. For instance, likelihood can be a statistical measure of how close the initial pose of the incoming aircraft 214 matches the actual pose of the incoming aircraft 214.

In response to the likelihood meeting or exceeding a threshold, the computing device 206 can identify a location of the incoming aircraft 214 on the airfield 202 at the airport 200 and that the initial pose of the incoming aircraft 214 as the actual pose of the incoming aircraft 214. For example, since the initial pose of the incoming aircraft 214 matches the actual pose, the computing device 206 can identify the location of the incoming aircraft 214 on the airfield 202, as a particular pose of an aircraft can be known to the computing device 206 at particular distances from the Lidar sensor 204.

The computing device 206 can generate and transmit a stopping location 220 on the airfield 202 of the airport 200 to the incoming aircraft 214. For example, based on the location of the incoming aircraft 214 and the actual pose of the incoming aircraft 214, the computing device can generate and transmit a stopping location 220 that may be able to be utilized by the incoming aircraft 214. Further, as previously described in connection with FIG. 1, the computing device 206 can generate and transmit the stopping location 220 based on the aircraft type, the aircraft sub-type, and the location of the incoming aircraft 214 and the actual pose of the incoming aircraft 214.

In some examples, the likelihood of the initial pose may not exceed the threshold. In such an instance, the computing device 206 can iterate the pose estimation until the determined likelihood of the generated pose of the 3D model of the aircraft 208 meets or exceeds the threshold, as is further described in connection with FIGS. 3A and 3B.

Figures 3A, 3B:
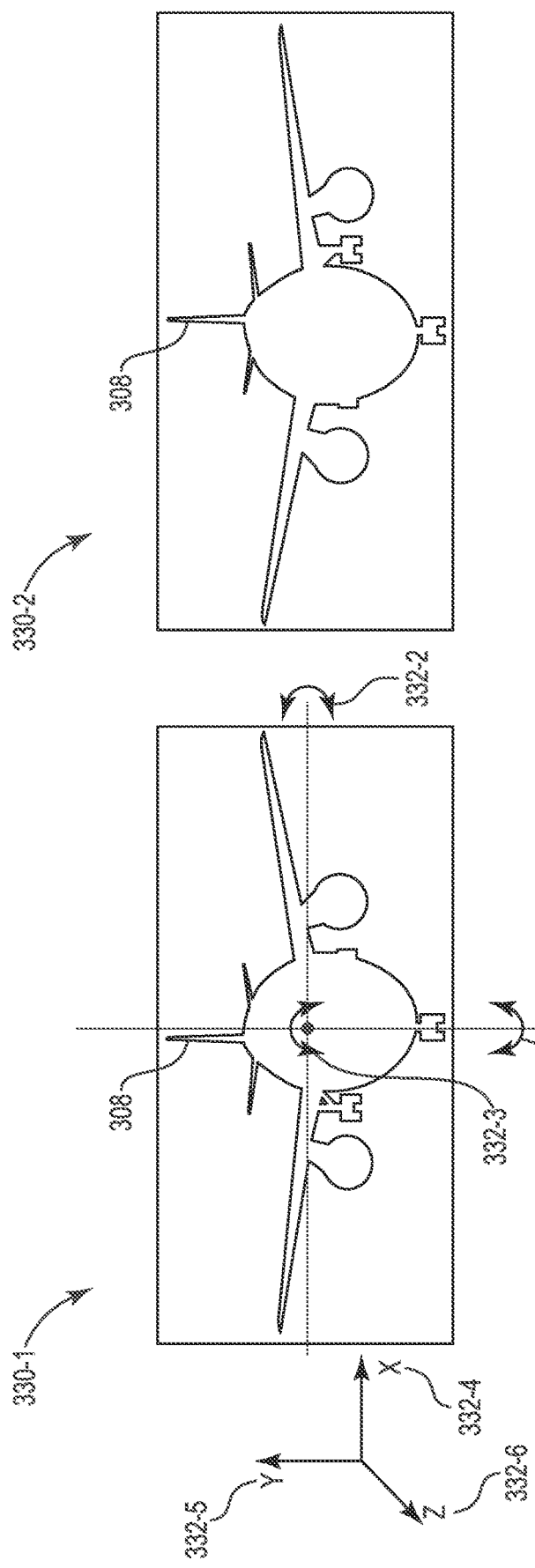
FIG. 3A is an example of a three-dimensional (3D) model of an incoming aircraft in an initial pose for aircraft identification, in accordance with one or more embodiments of the present disclosure.
FIG. 3B is an example of a 3D model of an incoming aircraft in a new pose for aircraft identification, in accordance with one or more embodiments of the present disclosure.

FIG. 3A is an example of a three-dimensional (3D) model 308 of an incoming aircraft in an initial pose 330-1 for aircraft identification, in accordance with one or more embodiments of the present disclosure. The initial pose 330-1 of the 3D model 308 can include attributes 332.

As previously described above, in some examples the likelihood of the initial pose may not exceed the threshold. In such an example the computing device (e.g., computing device 106, 206, previously described in connection with FIGS. 1 and 2, respectively) can iterate pose estimation until a determined likelihood of a generated pose of the 3D model 308 of the incoming aircraft meets or exceeds the threshold, as is further described herein.

In an example in which the likelihood does not meet or exceed the threshold, the computing device can modify attributes 332-1, 332-2, 332-3, 332-4, 332-5, and/or 332-6 (referred to collectively herein as attributes 332) of the initial pose 330-1 of the incoming aircraft to generate a new pose (e.g., new pose 330-2, as is further described in connection with FIG. 3B). As used herein, the term "attribute" refers to a positional characteristic of an object. For instance, the attributes 332 can describe positional characteristics of the 3D model 308 of the incoming aircraft relative to a reference point. The attributes 332 can be, for instance, positional characteristics relative to a center line of the 3D model 308 of the aircraft, as are further described herein.

The attributes 332 can be degrees of freedom associated with the 3D model 308 of the aircraft. Such degrees of freedom can include a yaw attribute (e.g., 332-1), a pitch attribute (e.g., 332-2), a roll attribute (e.g., 332-3), a left/right attribute (e.g., 332-4), an up/down attribute (e.g., 332-5), and/or a forward/backward attribute (e.g., 332-6). For example, the computing device can modify a yaw attribute 332-1 of the initial pose of the 3D model 308 of the incoming aircraft. The attribute can be modified in a direction of increasing likelihood of meeting or exceeding the threshold. Such modification of the attribute 332-1 can generate a new pose 330-2, as is further described in connection with FIG. 3B.

FIG. 3B is an example of a 3D model 308 of an incoming aircraft in a new pose 330-2 for aircraft identification, in accordance with one or more embodiments of the present disclosure. The new pose 330-2 can be the pose of the 3D model 308 of the incoming aircraft after modification by the computing device (e.g., computing device 106, 206, previously described in connection with FIGS. 1 and 2, respectively).

The computing device can simulate virtual Lidar sensor data for the 3D model 308 of the aircraft at the new pose 330-2 to generate a revised simulated point cloud corresponding to the 3D model 308 of the aircraft. For example, utilizing a simulation software program, the computing device can simulate targeting of the 3D model 308 of the aircraft in the new pose 330-2 with a virtual Lidar sensor (e.g., virtual Lidar sensor 218, previously described in connection with FIG. 2) having a virtual laser and logging the reflected virtual returned light from the 3D model 308 of the aircraft with the 3D model 308 of the aircraft oriented in the new pose 330-2. Such simulation can generate a revised simulated point cloud corresponding to the 3D model 308 of the aircraft.

The computing device can compare the revised simulated point cloud with the generated point cloud from the Lidar sensor on the airfield to determine a likelihood of the new pose 330-2 matching an actual pose of the incoming aircraft. In response to the likelihood meeting or exceeding a threshold, the computing device can identify a location of the incoming aircraft on the airfield at the airport and that the new pose 330-2 of the incoming aircraft is the actual pose of the incoming aircraft. For example, since the new pose 330-2 of the incoming aircraft matches the actual pose, the computing device can identify the location of the incoming aircraft on the airfield, as a particular pose of an aircraft can be known to the computing device at particular distances from the Lidar sensor on the airfield.

Lastly, the computing device can generate and transmit a stopping location on the airfield of the airport to the incoming aircraft. For example, based on the location of the incoming aircraft and the actual pose of the incoming aircraft, the computing device can generate and transmit a stopping location that may be able to be utilized by the incoming aircraft. Further, as previously described in connection with FIG. 1, the computing device can generate and transmit the stopping location based on the aircraft type, the aircraft sub-type, and the location of the incoming aircraft and the actual pose of the incoming aircraft (e.g., being the new pose 330-2).

FIG. 4 is an example of a computing device 406 for aircraft identification, in accordance with one or more embodiments of the present disclosure. The computing device 406 can include a processor 434 and a memory 436.

The memory 436 can be any type of storage medium that can be accessed by the processor 434 to perform various examples of the present disclosure. For example, the memory 436 can be a non-transitory computer readable medium having computer readable instructions (e.g., computer program instructions) stored thereon that are executable by the processor 434 for aircraft identification in accordance with the present disclosure.

The memory 436 can be volatile or nonvolatile memory. The memory 436 can also be removable (e.g., portable) memory, or non-removable (e.g., internal) memory. For example, the memory 436 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 436 is illustrated as being located within the computing device 406, embodiments of the present disclosure are not so limited. For example, memory 436 can also be located internal to another computing resource (e.g., enabling computer readable instructions to be downloaded over the Internet or another wired or wireless connection).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for aircraft identification, comprising:
   a memory; and
   a processor configured to execute instructions stored in the memory to:
      simulate virtual light detection and ranging (Lidar) sensor data for a three-dimensional (3D) model of an aircraft type by targeting, with a virtual Lidar sensor in a fixed location in a 3D polygonal mesh model of an airport, the 3D model of the aircraft along a predefined trajectory from an initial location to a stopped location in the 3D polygonal mesh model of the airport to generate a first point cloud corresponding to the 3D model of the aircraft type;
      generate a classification model utilizing the simulated virtual Lidar sensor data of the 3D model of the aircraft type; and
      identify a type of an incoming aircraft at an airport by:
         receiving, from a Lidar sensor at the airport, Lidar sensor data for the incoming aircraft;
         generating a second point cloud corresponding to the incoming aircraft utilizing the Lidar sensor data for the incoming aircraft; and
         classifying the second point cloud corresponding to the incoming aircraft using the classification model.

2. The computing device of claim 1, wherein the processor is configured to execute the instructions to generate and transmit a stopping location on an airfield of the airport to the incoming aircraft based on the identified type of the incoming aircraft.

3. The computing device of claim 1, wherein the processor is configured to execute the instructions to compare the identified incoming aircraft type with a predetermined aircraft type for the incoming aircraft.

4. The computing device of claim 3, wherein the processor is configured to at least one of:
   transmit an alert in response to the identified incoming aircraft type not matching the predetermined aircraft type; and
   update a stopping location on an airfield of the airport to correspond to the identified incoming aircraft type in response to the identified aircraft type not matching the predetermined aircraft type.

5. The computing device of claim 1, wherein identifying the type of the incoming aircraft comprises identifying a sub-type of the incoming aircraft.

6. The computing device of claim 1, wherein each point along the predefined trajectory is at a known distance from a location of the virtual Lidar sensor in the 3D model of the airport.

7. The computing device of claim 6, wherein:
   a point cloud corresponding to the 3D model of the aircraft type is generated at each point along the predefined trajectory; and
   each point cloud generated at each point along the predefined trajectory includes a location relative to the location of the virtual Lidar sensor in the 3D model of the airport.

8. The computing device of claim 1, wherein the 3D model of the aircraft type is a predefined polygonal mesh model.

9. A computing device for aircraft identification, comprising:
   a memory; and
   a processor configured to execute instructions stored in the memory to:
      receive, from a light detection and ranging (Lidar) sensor at an airport, Lidar sensor data for an incoming aircraft;
      generate a point cloud corresponding to the incoming aircraft utilizing the Lidar sensor data for the incoming aircraft;
      determine an initial pose of the incoming aircraft and orient a three-dimensional (3D) model of the incoming aircraft in the initial pose at a location in a 3D model of an airfield of an airport;
      simulate virtual Lidar sensor data for the 3D model of the incoming aircraft at the initial pose to generate a simulated point cloud corresponding to the 3D model of the incoming aircraft;
      compare the simulated point cloud with the generated point cloud to determine a likelihood of the initial pose of the incoming aircraft matching an actual pose of the incoming aircraft; and
      in response to the likelihood meeting or exceeding a threshold, identify a location of the incoming aircraft on the airfield at the airport and the initial pose of the incoming aircraft as the actual pose of the incoming aircraft.

10. The computing device of claim 9, wherein in response to the likelihood not meeting or exceeding the threshold, the processor is configured to execute the instructions to modify an attribute of the initial pose of the incoming aircraft to generate a new pose.

11. The computing device of claim 10, wherein the processor is configured to execute the instructions to:
   simulate virtual Lidar sensor data the 3D model of the incoming aircraft at the new pose to generate a revised simulated point cloud corresponding to the 3D model of the incoming aircraft; and
   compare the revised simulated point cloud with the generated point cloud to determine a likelihood of the new pose of the incoming aircraft matching the actual pose of the incoming aircraft.

12. The computing device of claim 11, wherein in response to the likelihood of the new pose meeting or exceeding the threshold, the processor is configured to identify a location of the incoming aircraft on the airfield at the airport and the new pose of the incoming aircraft as the actual pose of the incoming aircraft.

13. The computing device of claim 10, wherein the attribute is a degree of freedom associated with the 3D model of the incoming aircraft.

14. The computing device of claim 9, wherein the processor is configured to determine the initial pose of the incoming aircraft via a visual sensor located on the airfield at the airport.

15. A system for aircraft identification, comprising:
- a light detection and ranging (Lidar) sensor located at an airfield of an airport; and
- a computing device configured to:
  - identify an aircraft type and an aircraft sub-type of an incoming aircraft to the airport by:
    - receiving, from the Lidar sensor at the airport, Lidar sensor data for the incoming aircraft to the airport;
    - generating a point cloud corresponding to the incoming aircraft utilizing the Lidar sensor data for the incoming aircraft; and
    - classifying the generated point cloud corresponding to the incoming aircraft using a classification model;
  - identify a location of the incoming aircraft on the airfield at the airport and a pose of the incoming aircraft according by pose estimation including:
    - determining an initial pose of the incoming aircraft and orienting a three-dimensional (3D) model of the incoming aircraft in the initial pose at a location in a 3D model of the airfield of the airport;
    - simulating virtual Lidar sensor data for the 3D model of the incoming aircraft to generate a simulated point cloud corresponding to the 3D model of the incoming aircraft;
    - comparing the simulated point cloud with the generated point cloud to determine a likelihood of the initial pose of the incoming aircraft matching an actual pose of the incoming aircraft; and
    - in response to the likelihood meeting or exceeding a threshold, identifying a location of the incoming aircraft on the airfield at the airport and the initial pose of the incoming aircraft as the actual pose of the incoming aircraft; and
  - generate and transmit a stopping location on the airfield of the airport to the incoming aircraft based on the aircraft type, the aircraft sub-type, the location of the incoming aircraft, and the actual pose of the incoming aircraft.

16. The system of claim 15, wherein the classification model includes a plurality of simulated point clouds corresponding to different 3D models of aircraft.

17. The system of claim 16, wherein the different 3D models of the aircraft include different aircraft types and aircraft sub-types.

18. The system of claim 15, wherein in response to the likelihood of the initial pose not exceeding the threshold, the computing device is to iterate the pose estimation until a determined likelihood of a generated pose of the 3D model of the incoming aircraft meets or exceeds the threshold.

19. The system of claim 15, wherein the Lidar sensor at the airport is a two-dimensional (2D) Lidar sensor.

* * * * *